May 20, 1941.   J. G. VINCENT   2,242,276
MOTOR VEHICLE
Filed March 7, 1939   5 Sheets-Sheet 4
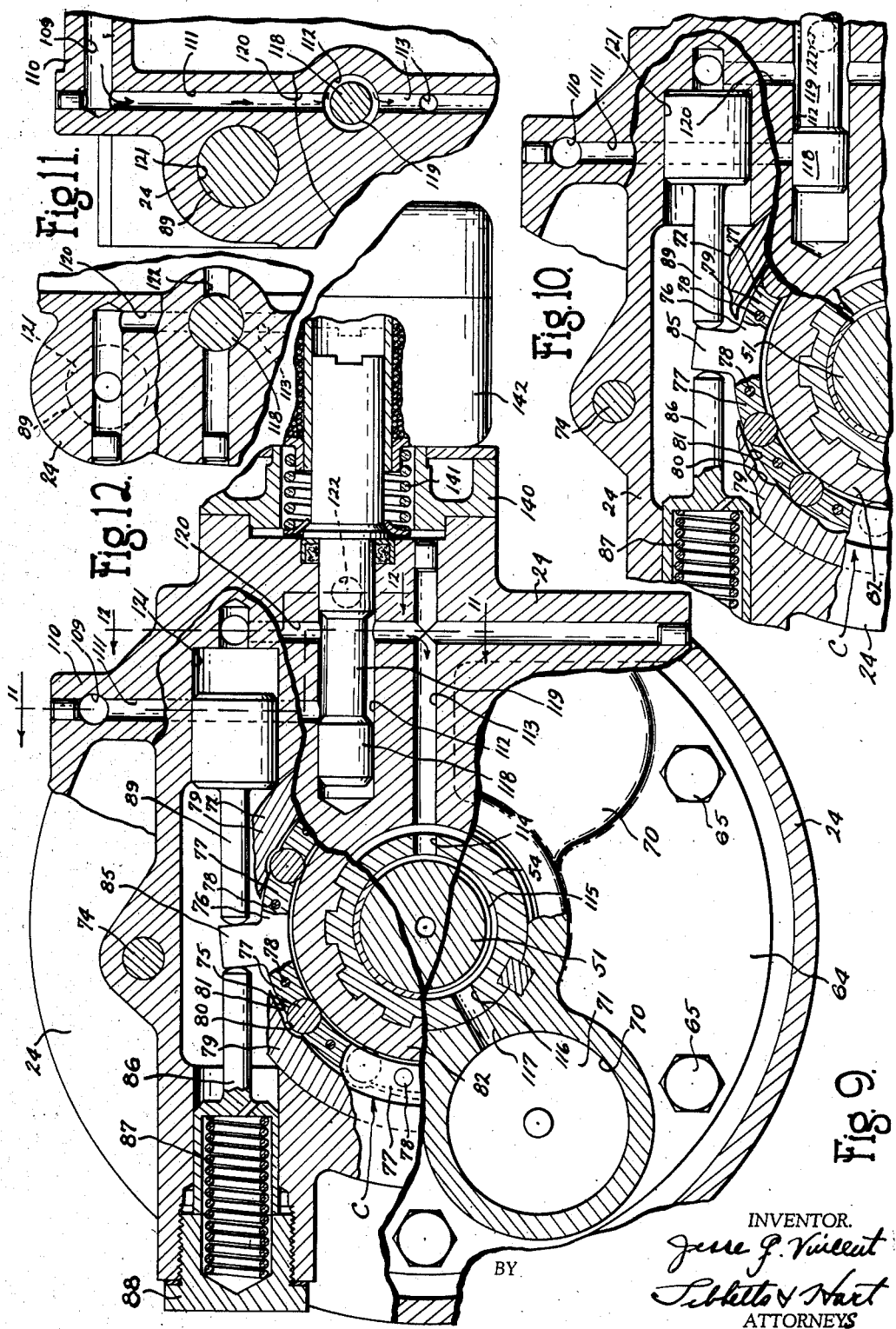
INVENTOR.
Jesse G. Vincent
BY
Sibletto & Hart
ATTORNEYS May 20, 1941.  J. G. VINCENT  2,242,276
MOTOR VEHICLE
Filed March 7, 1939  5 Sheets-Sheet 5

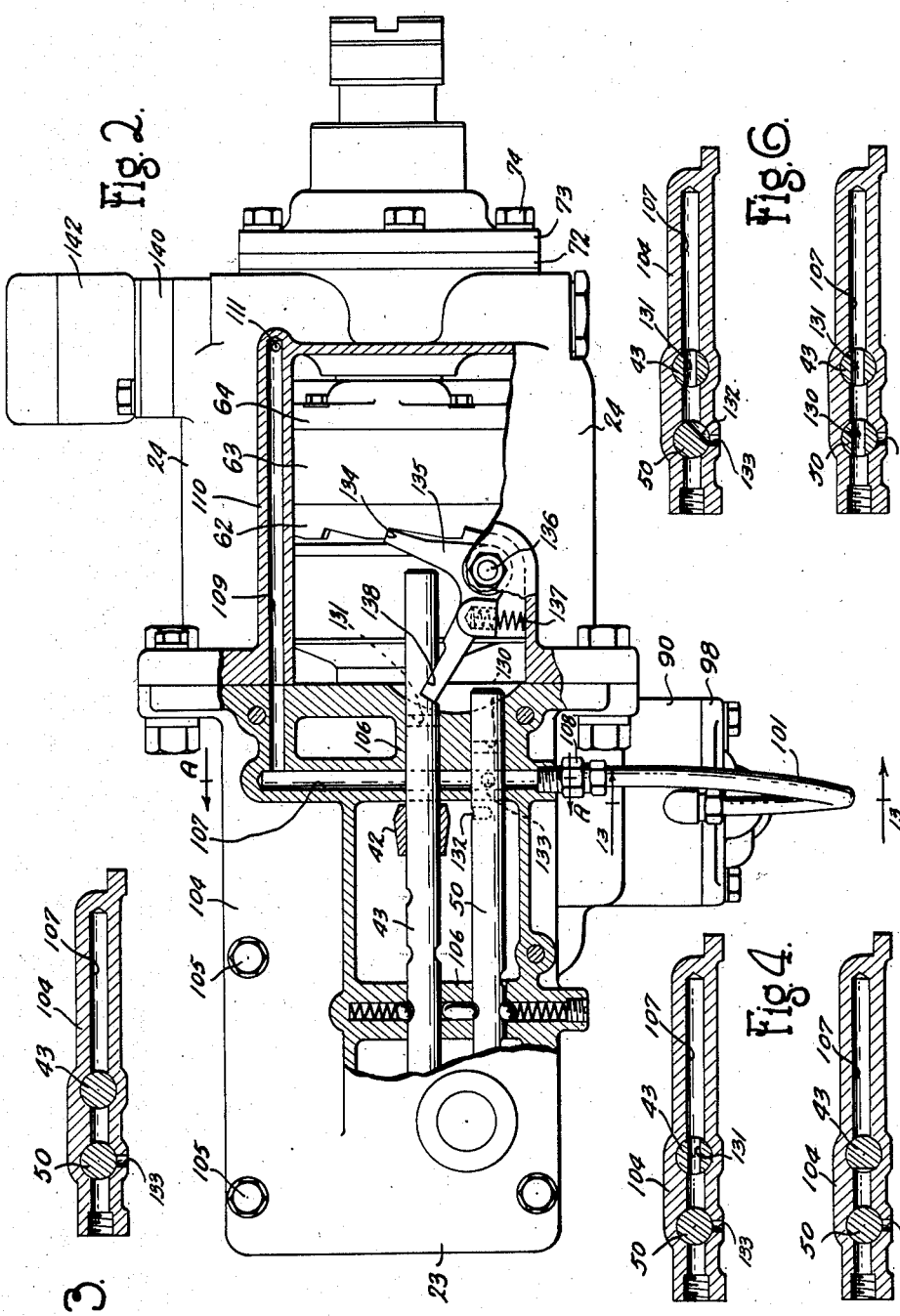

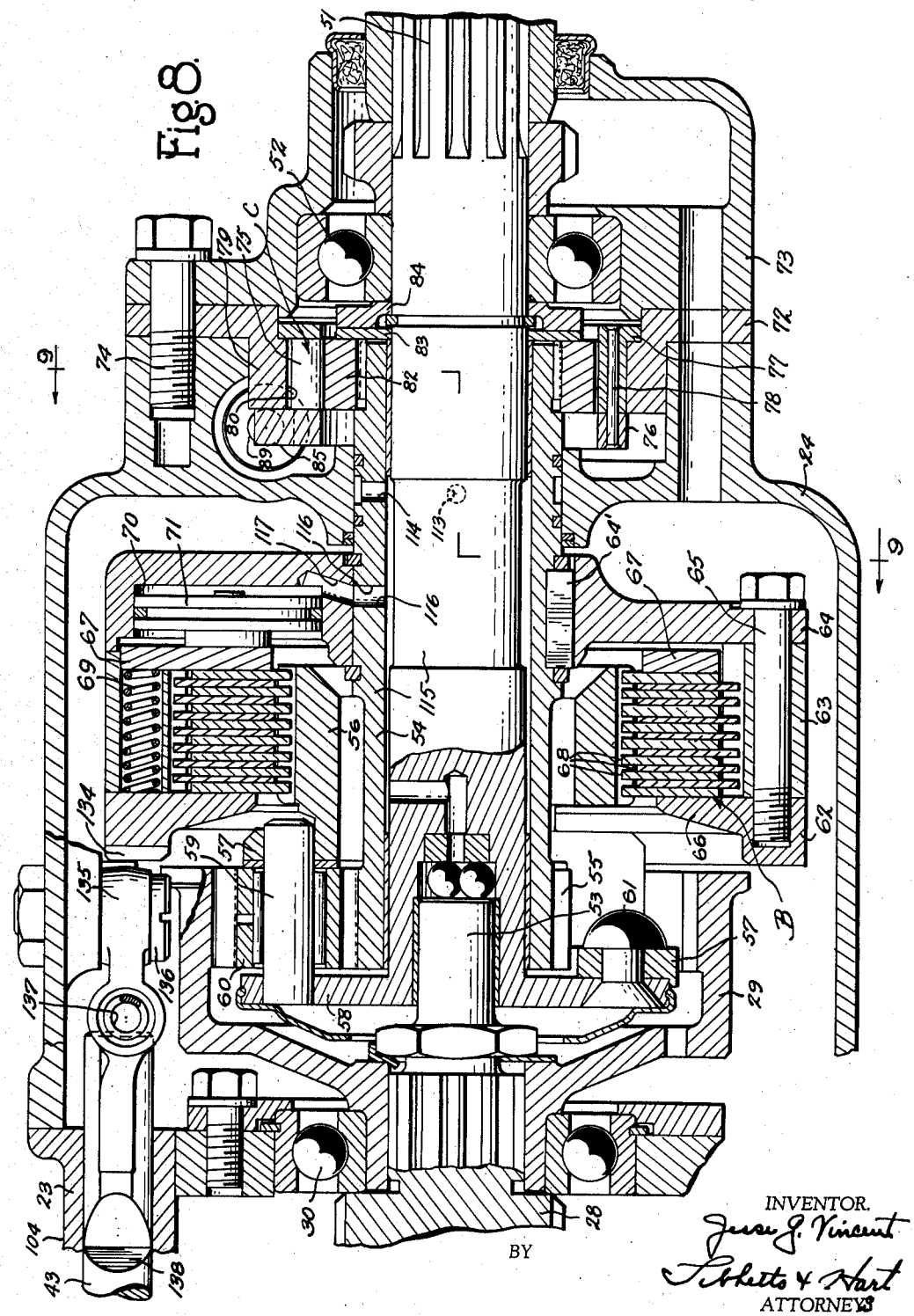

INVENTOR.
Jesse G. Vincent
BY
Sibbetts & Hart
ATTORNEYS

Patented May 20, 1941

2,242,276

UNITED STATES PATENT OFFICE 2,242,276

MOTOR VEHICLE

Jesse G. Vincent, Grosse Pointe, Mich., assignor to Packard Motor Car Company, Detroit, Mich., a corporation of Michigan Application March 7, 1939, Serial No. 260,403

20 Claims. (Cl. 74—328)

This invention relates to power transmitting mechanism and more particularly to such mechanism designed for use in motor driven vehicles.

An object of the invention is to provide mechanism of the class mentioned in which the drive from change speed gearing can be readily modified by the driver without using his hands or shifting his feet on the controls.

Another object of the invention is to provide power transmitting mechanism for vehicles having planetary gearing that is controlled by a disk clutch and an overrunning clutch under the control of the vehicle driver.

Another object of the invention is to provide a planetary drive for vehicles that can be modified by a power operated clutch arrangement controllable at will by the vehicle driver through actuation of the accelerator pedal.

Another object of the invention is to provide an efficient fluid pressure system for varying the driving speed of a vehicle transmission in which a substantially constant pressure is maintained during operation.

A further object of the invention is to provide a fluid control arrangement for a pair of clutches which is obtained by an electric system under manual domination.

Another object of the invention is to provide a power transmitting mechanism for vehicles in which high speed is modified by power means under the joint control of change speed changing means and the accelerator.

Other objects of the invention will appear from the following description taken in connection with the drawings, which form a part of this specification:

Fig. 2 is a plan view of a portion of the power transmitting mechanism partly broken away showing the shift rail control for the fluid pressure system and the lock for the planetary gearing when in reverse drive;

Fig. 3 is a fragmentary sectional view taken on line A—A of Fig. 2, showing the position of the shift rails in the fluid system during reverse drive;

Fig. 4 is a similar section on line A—A of Fig. 2 showing the position of the shift rails in the fluid system when the power transmitting mechanism is in neutral position;

Fig. 5 is a fragmentary sectional view taken on line A—A of Fig. 2 showing the position of the shift rails in the fluid system when the power transmitting mechanism is in first speed relation;

Fig. 6 is another sectional view taken on line A—A of Fig. 2 showing the position of the shift rails in the fluid system when the power transmitting mechanism is in second speed relation;

Fig. 7 is another section taken on line A—A showing the position of the shift rails in the fluid system when the mechanism is in high speed relation;

Fig. 8 is an enlargement of a fragment of the mechanism shown in Fig. 1, showing the planetary gearing and its control;

Fig. 9 is a sectional view taken substantially on line 9—9 of Fig. 8;

Fig. 10 is a similar section to that shown in Fig. 9 with the control mechanism for the overrunning clutch in a different position;

Fig. 11 is a sectional view taken on line 11—11 of Fig. 9;

Fig. 12 is a sectional view taken on line 12—12 of Fig. 9;

Figure 1:
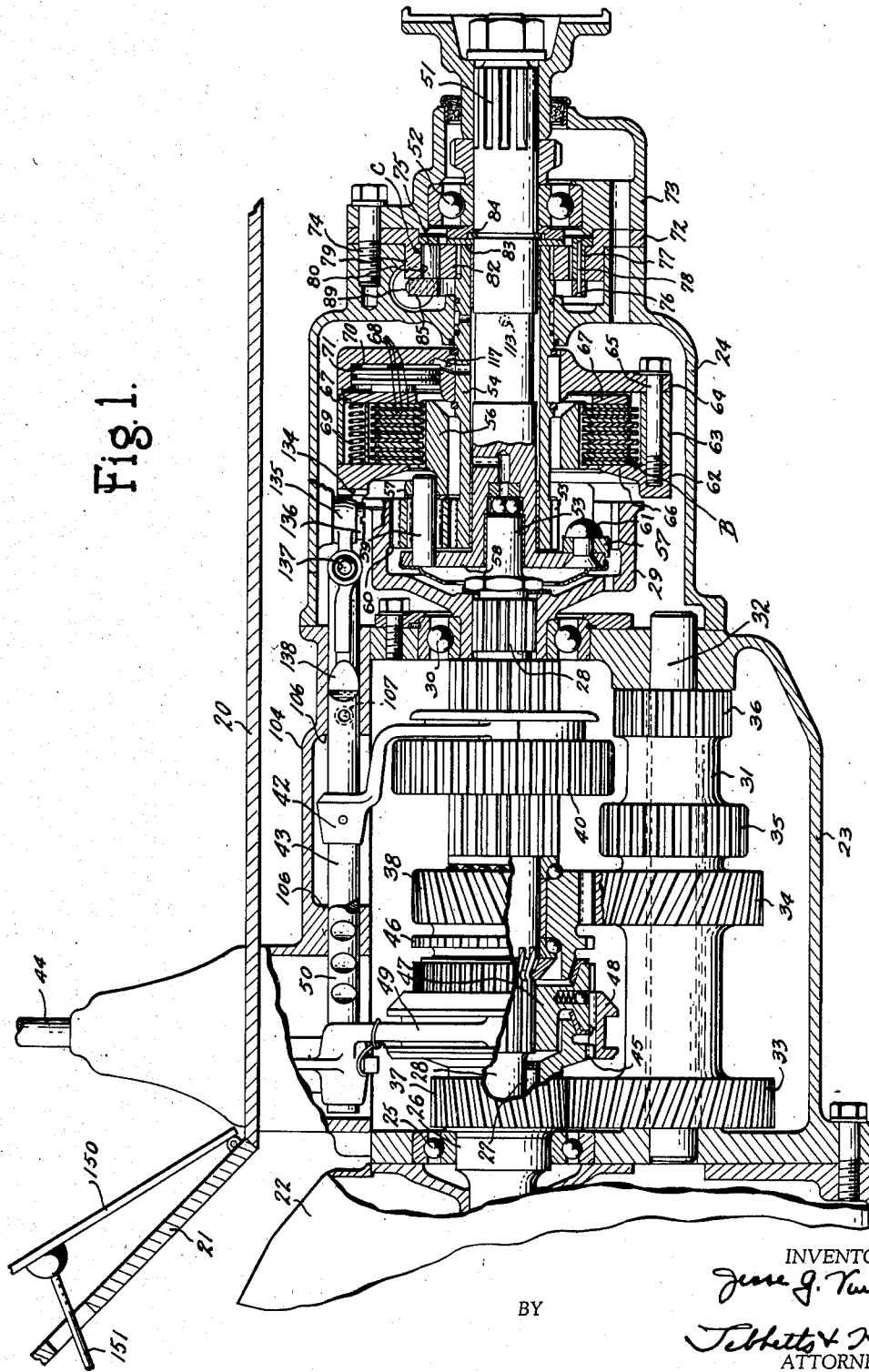
Fig. 1 is a vertical sectional view through a portion of a motor vehicle showing the power transmitting mechanism.

The power transmitting mechanism herein described is designed for use where a plurality of driving speed ratios is desired, and it is particularly adapted for use in motor vehicles. The power transmitting mechanism is shown arranged beneath the floor board 20 and the toe board 21 of the vehicle in a conventional manner. The casing structure for the mechanism comprises generally bolted-together sections 22, 23 and 24. Section 22 houses the conventional clutch and flywheel, not shown, section 23 houses conventional change speed gearing for obtaining a plurality of forward drive speed ratios and a reverse drive, and section 24 houses mechanism for obtaining a driving speed ratio between the two highest speed ratios obtainable with the mechanism in section 23, commonly known as "underdrive mechanism."

The front wall of the casing 23 carries a suitable bearing 25 in which is mounted the enlarged rear end of drive shaft 26, which may be the vehicle clutch shaft, driven from the vehicle engine through conventional clutch mechanism. The enlarged end of the drive shaft is formed with an axial recess for the reception of bearing 27, in which the forward end of the driving or tail shaft 28 is journaled. The rear end of the tail shaft extends through the rear wall of the casing section 23 and has splined thereon a gear 29 journaled in bearing 30. A gear spool 31 or countershaft is mounted on shaft 32 in the casing section 23 and has fixed thereon gears 33, 34, 35 and 36. Gear 33 is in constant mesh with a gear 37 formed on the enlarged end of the clutch shaft 26 so that the countershaft is continuously connected in driven relation with the clutch shaft. Gear 34 is continuously in mesh with a gear 38 which is rotatably mounted on the tail shaft 28.

Figure 13:
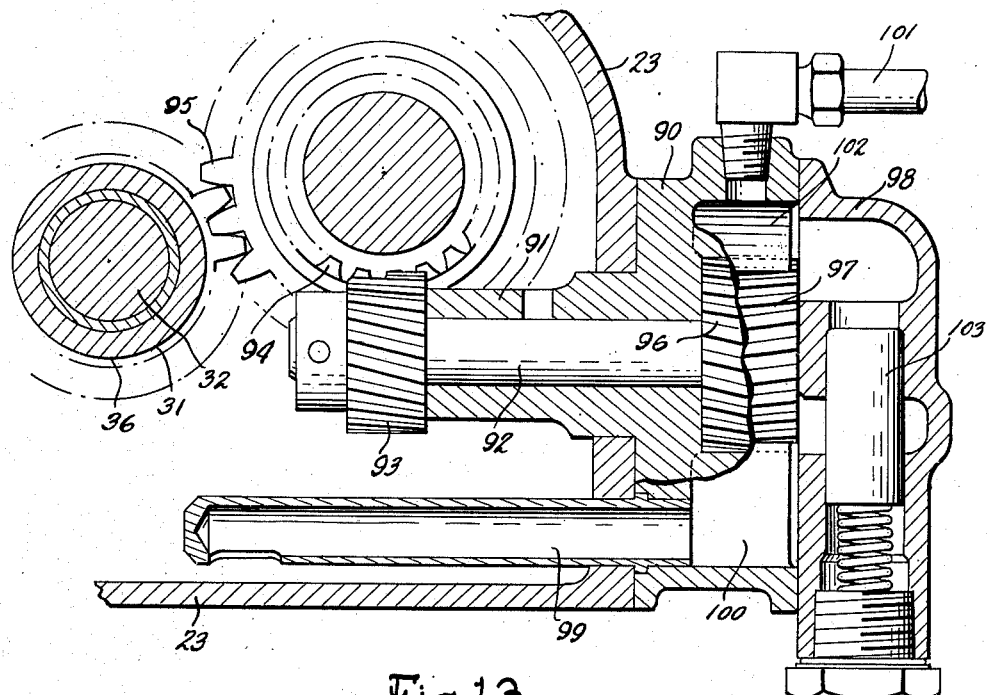
Fig. 13 is a sectional view through the power transmitting mechanism showing the pump portion of the fluid pressure system.

Gears 35 and 36 constitute the low speed and reverse gears respectively. Slidably splined on the tail shaft 28 is a gear 40 that has external teeth engageable with gear 35 or with a reverse idler 95, see Fig. 13, that meshes with gear 36. Shifter fork 42 engages the gear 40 and is carried by shift rail 43 mounted in the top portion of the central casing section 23. The shift rail is selectively actuated by a shift lever 44, of a conventional form, which may be manually operated by the vehicle driver in the well known manner.

Thus in the illustrated embodiment of the change speed gearing, gear 40 may be moved to establish a driving connection between the first gear 35 and the tail shaft or from the reverse gear 36 to the tail shaft. Second forward speed is provided by connecting gear 38 with the tail shaft, and high forward speed is secured by coupling shafts 26 and 28 together. Gear 37 has clutch teeth 45 formed thereon and similar clutch teeth 46 are formed on gear 38. Between these clutch teeth 45 and 46 is a movable synchronizing clutch having a hub section 47 slidably splined to shaft 28 and a rim section 48, such sections having slidably engaged teeth and the teeth of the rim section being engageable with clutch teeth 45 or 46. When the clutch rim section engages clutch teeth 45 direct drive is established between shafts 26 and 28, and when the rim section engages clutch teeth 46 then gear 38 is coupled to the tail shaft and a second speed forward drive is obtained. This rim section of the clutch has a shifter fork 49 associated therewith which is mounted on shift rail 50 controlled by the lever 44.

A driven shaft 51 extends through the rear wall of the casing section 24 and is journaled in bearing 52 and on pilot 53 projecting from the rear end of the tail shaft 28. The tail shaft 28 and the driven shaft 51 are drivingly connected by planetary gearing that may be controlled to establish a direct drive or to establish a reduced drive, the reduced drive being established preferably only when the tail shaft is being driven directly from the drive shaft thereby establishing a third speed forward drive. A sleeve 54 is rotatably mounted on shaft 51 in casing section 24 and carries at its forward end sun gear 55. Encircling the sleeve is a hub 56 having a flanged forward end 57 and at the forward end of the driven shaft 51 is a flange 58. Such flanges 57 and 58 are secured together in spaced relation by rivets 61 and provide supports for pins 59 on which planet gears 60 are rotatably mounted, the planet gears are arranged to mesh with the sun gear and with the teeth on the interior of the tail gear 29. Associated with the planetary gearing is a clutch B for locking the same to establish a direct drive between the tail shaft 28 and the driven shaft 51, and releasing the planetary gearing to reduce the drive from the tail shaft 28 to the driven shaft 51.

The hub 56 forms the inner section of the planetary control clutch and the outer section thereof is made up of a plurality of sections consisting of annular members 62, 63 and 64 fixed together by bolts 65. A flange 66 extends inwardly from the clutch casing section 62 and acts as a backing element for the clutch, and in advance of the casing section 64 which is keyed to the sun gear shaft as at 64' in a pressure plate 67. A plurality of disk plates 68 are arranged between the pressure plate and the backing plate and they are alternately arranged to drivingly engage the hub 56 and the clutch casing section 63. Coil springs 69 are arranged within the clutch casing and normally exert sufficient pressure to move the pressure plate 67 out of clutch engaging relation.

Formed in the clutch section 64 are cylinders 70 in which are arranged pistons 71, such pistons each having a forward extension against which the pressure plate is held by the coil springs 69. As the casing section 64 is keyed to the sun gear shaft and as the clutch hub 56 is fixed to the driven gear by means of the rivets 61, engagement of the clutch disks will lock shaft 51 with the sun gear so that planetary gearing will be fixed so that it cannot rotate relatively and a direct drive will thus be established therethrough from shaft 28 to shaft 51. When the clutch is released then the hub 56 is free to rotate relative to the sun gear sleeve 54 and the planetary gearing will provide a reduced drive from shaft 28 to shaft 51, the sleeve being held by an overrunning brake to prevent it from rotating freely.

The rear portion of casing section 24 is in sectional form and provides a housing for the overrunning brake C, such sections 72 and 73 being secured to the main portion of the section 24 by bolts 74. The overrunning brake rollers 75 are carried by a cage consisting of axially spaced ring members 76 and 77 that are joined together by pin 78. The rollers are held between the cage sections 76 and 77 and lie within the race of hub portion 79 of the casing section 72, the inner wall of such hub portion being formed with arcuate recesses 80 that are connected at one side with an angular wall portion 81 and arranged to cooperate one with each roller. Another hub in the form of an annulus 82 is splined on the sun gear sleeve 54 and serves as a race for the rollers 75. Thrust member 83 is arranged to engage the rear end of the annulus 82 and is held in such position by a retainer ring 84 which abuts the bearing 52. Projecting from the section 76 of the roller cage is a finger 85 which is engaged by a plunger 86. This plunger has a hollow portion in which coil spring 87 is arranged and such spring also extends into a hollow nut 88 that is screwed into the casing section 24. The spring 87 normally urges the plunger in a direction to hold the roller cage so that the rollers are wedged against the tapered wall portions 81 of the casing section 72 and in such relation the rollers serve to lock the annulus 82 with the casing 72 to thereby prevent free rotation of the sun gear sleeve 54 when the planetary gearing is free to reduce the drive.

When there is a direct drive between shafts 28 and 51 and the planetary gearing is locked, then the cage must be moved into a position releasing the rollers and this is accomplished by a plunger 89 bearing against finger 85, the plunger being under control of the fluid pressure system.

The fluid pressure system is arranged to communicate with the oil in the sump of the change speed gearing casing section 23. Pump housing 90 is arranged on the outside of the casing section and has an extension 91 that projects through one wall of the casing 23 in which is journaled a driving shaft 92. On the inner end of this shaft is a gear 93 that meshes with gear 94 on the shaft carrying the reverse idler 95, the reverse idler of course being in constant mesh with the countershaft gear 36. A pump gear 96 is fixed to the outer end of shaft 92 and meshes with another pump gear 97, both contained in the pump housing. End plate 98 is bolted to the pump housing and encloses the pump gears. Oil tube 99 leads into the pump chamber 100 from the sump and tubing 101 is connected with the outer end 102 of the pump chamber. A spring controlled relief valve 103 of conventional form is provided in the pump cover plate so that fluid will be by-passed back to the sump when a predetermined pressure at the delivery side of the system is reached.

Casing section 23 is provided with a top cover 104 secured by bolts 105 and having bearings 106 for supporting the shift rails 43 and 50. The cover 104 is also provided with a transversely extending passage 107 with one end of which the conduit 101 is connected by a suitable coupling 108 and this passage 107 is arranged to traverse the shift rail bearings so that the rails will act as valves for controlling the flow of fluid. The other end of passage 107 extends longitudinally of the casing section and communicates with the passage 109 formed in a wall portion 110 of casing section 24. The rear end of this longitudinally extending passage 109 communicates with a vertically extending passage 111 which in turn communicates with a valve chamber 112 in the rear end of the main portion of casing section 24. There is an outlet passage 113 leading from the valve chamber that communicates with an opening 114 in the sun gear shaft 54 and adjacent this opening the driven shaft 51 has a portion 115 formed of reduced diameter to provide communication between opening 114 and passage 116 in the sun gear shaft. This passage 116 communicates with passages 117 leading to the rear ends of chambers 70.

A valve 118 is slidably arranged in the chamber 112 and is formed with a reduced portion 119 around which fluid can flow from passage 111 to passage 113. When the reduced portion of the valve is in position to establish communication between passage 111 and 113, fluid will flow from the pump to the cylinder 70 and will exert pressure against the pistons to move them forwardly to a position where the pressure plate will engage the disks of clutch B to thus lock the hub 56 with the sun gear shaft 54 and thereby lock the planetary gearing so that there is a direct drive established between shaft 28 and driven shaft 51.

There is also a passage 120 leading from the valve chamber to the rear end of chamber 121 in which the plunger 89 is reciprocable and this passage 120 is so arranged that it will be open to passage 111 whenever communication is established between passage 111 and passage 113. Thus whenever the fluid system is effective to engage clutch B it will also be effective to move the plunger in a direction so that it will overcome the spring pressure behind the plunger 86 and will move the overrunning brake cage into a disengaged position as shown in Fig. 9. Passage 122 also communicates with the valve chamber 112 and is arranged so that it will be uncovered by the valve 118 when the valve closes passage 111 to thus serve as a drain for the fluid chamber 121 leading to the piston 89 as well as for passage 113. This relief of the fluid pressure allows the spring 87 to again move the plunger 86 into position where it will hold the roller cage so that the rollers will wedge and prevent rotation of the sun gear shaft as shown in Fig. 10, as long as the speed of the tail shaft exceeds that of the driven shaft. Passage 122 drains back into the interior of casing 24 and then into casing 23 by suitable connections.

Fluid flow from the pump to the valve chamber 112 is controlled by the shift rails 43 and 50. The arrangement is such that fluid can flow through passage 107 only when the shift rails are in position establishing a high speed drive through the change speed gearing in casing section 23. The rail 50 is formed with passage 130 that can be moved to register with the passage 107 and the rail 43 is provided with a passage 131 that can be moved to register with the passage 107. Thus when the passages 130 and 131 align with the passages 107, as they do when shifted to establish a high speed drive through the change speed gearing, fluid can flow from the pump to the valve chamber 112 as shown in Fig. 7. In all other positions of the shift rails at least one of the rails will shut off fluid flow to passage 107 as shown in Figs. 3, 4, 5 and 6. The rail 50 is also formed with a groove 132 that is arranged to communicate with a drain opening 133 in the casing when the rails are shifted to establish second speed through the change speed mechanism, and in such relation the opening 131 in shift rail 43 will be opened to passage 107 so that the fluid system beyond the shift rails can drain back into the casing 23. This drainage of the fluid system is required only when the change speed mechanism is in second speed relationship.

With the overrunning type of brake heretofore described it is necessary to lock a portion of the planetary gearing in order that the gearing will function when the change speed mechanism is shifted to establish reverse drive. As best shown in Fig. 2, such locking means is shown controlled by the shift rail 43. The forward end of the clutch housing section 62 is formed with teeth 134 that can be engaged by a bell crank 135 secured to casing 24 by a pin 136. A coil spring 137 is arranged to exert pressure against the bell crank in a direction normally engaging the same with the teeth 134 to prevent rotation thereof when the change speed gearing is in reverse drive. Shift rail 43 is formed with a recess 138 into which the bell crank can be moved by the spring when the shifter rod is in position to establish reverse drive through the change speed mechanism but at all other times the shift rod serves to hold the bell crank out of engaging relation with teeth 134. Thus the lock will be engaged only when the shift rail 43 is moved to a position establishing reverse drive through the change speed mechanism. By thus holding the clutch portion of the planet gear carrier there will be a reduced two-way drive through the planetary gearing in reverse drive.

It will be observed that fluid flow is controlled by the shift rails 43 and 50 and by valve 118. The valve projects through the side of the casing 24 and through a cap 140 secured to the casing. The valve is normally held in open position by a coil spring 141 within the cap 140 so that fluid is free to flow to clutch B and to the pistons 89 whenever the rails open the system to the valve chamber.

With the rails allowing fluid flow through the system, clutch B will be closed and the overrunning brake will be released so that high speed or direct drive is established from shaft 28 to shaft 51 through the planetary gearing. With the change speed gearing in such relation the planetary gearing can be made to function to provide a reduced drive from shaft 28 to shaft 51 by moving valve 118 to shut off the fluid flow from passage 111 to clutch B. As a means of moving the valve 118 to fluid shut off position, an electrical system is preferred. It is also preferred to control the electrical system by mechanism operating in response to pressure against the accelerator pedal beyond a relation in which the throttle valve is in wide open position. By such an arrangement the driver is not required to shift his hands or feet in order to control the valve to establish a reduction in drive from shaft 28 to shaft 51 when the change speed mechanism is adjusted for high speed drive.

Figure 14:
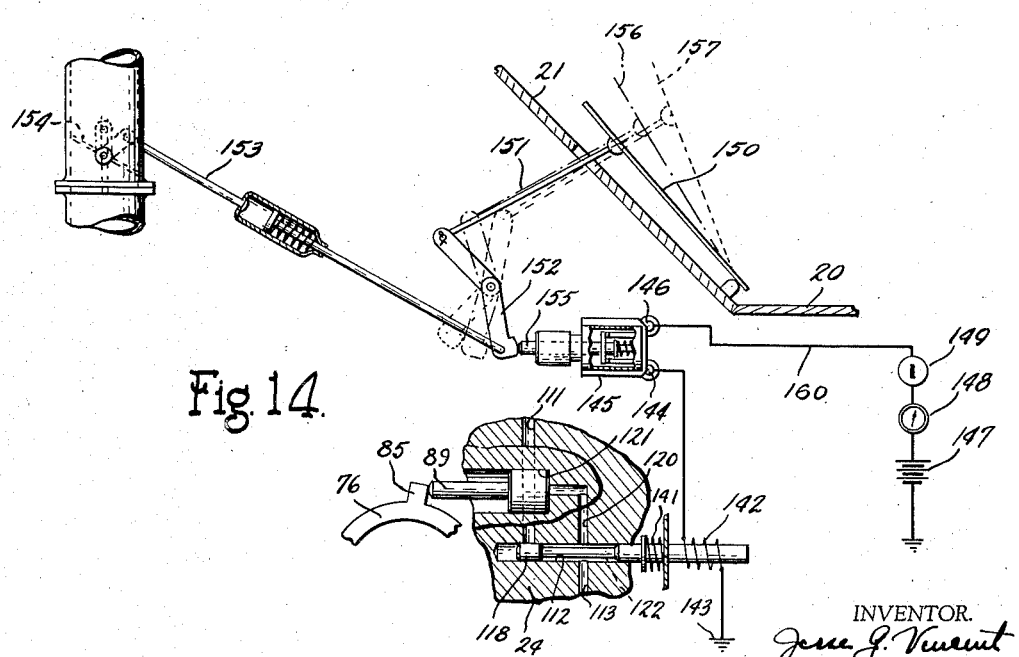
Fig. 14 is a diagrammatic view illustrating control mechanism for shifting power transmitting mechanism into and out of third speed relation.

A solenoid 142 is associated with the end of valve 118 projecting beyond the cap 140 and this solenoid is anchored to the casing section 24 by the same securing means that fastens the cap 140. As best shown in Fig. 14, the solenoid 142 is connected to a ground 143 and to the terminal 144 of a self-opening control switch 145, the other terminal 146 of this switch is connected to the motor vehicle battery 147 by wiring 160 with which the ammeter 148 and the ignition switch 149 are arranged. An electrical circuit is effective to energize the solenoid only when the ignition is turned on and the switch 145 is closed.

The throttle valve control pedal 150 is of the usual type and it is connected to operate a rod 151 that extends through the toe board 21 and is connected with a bell crank 152. An extensible link 153 connects the bell crank with the throttle valve 154. The switch contactor 155 is arranged so that the bell crank will move the contactor to close the switch when the accelerator pedal is moved beyond a position establishing wide open throttle position, as indicated in dot-and-dash lines at 156. The dotted lines 157 indicate the position of the throttle pedal when released. As shown in Fig. 14, the throttle pedal is fully depressed and thus the throttle valve is wide open and the bell crank is acting to close the switch 145 to energize the solenoid 142. When energized the solenoid serves to move the valve 118 outwardly against the action of spring 141 so that it closes passage 111 and the fluid pressure system is cut off from pistons 89 of clutch B. Under such circumstance fluid pressure against plunger 89 is also released so that spring 87 through plunger 86 will move the roller cage into overrunning relation and clutch B will be released so that the drive will be through the planetary gearing at a speed less than high speed but greater than second speed. As soon as the accelerator pedal is released so that the switch contactor can move out of relation energizing the solenoid, spring 141 returns valve 118 to position opening the fluid system to clutch B and direct drive is again established. Thus the accelerator pedal can be operated to control the mechanism so that a third speed forward can be established when the change speed gearing is in high speed relation and so that when in third speed the shift can be made back to high speed.

When the change speed gearing is in position for first speed forward drive, the fluid system is shut off from the clutch B and plunger 89. The planetary gearing sun gear sleeve will be held stationary by the overrunning brake, as shown in Fig. 10, while the tail shaft rotates faster than the driven shaft, but the power transmitting mechanism will free-wheel when the driven shaft overruns the tail shaft. These same conditions are present when the change speed gearing is in position for second speed forward drive.

When the change speed gearing is in position for high, that is fourth speed forward, the fluid system is open to clutch B thus locking the planetary gearing so that it transmits the drive directly from the tail shaft to the driven shaft. The fluid system also acts on plunger 89 at such time, as shown in Fig. 9, to hold the overrunning brake released. To obtain third speed forward, the change speed gearing must be in high speed relation, and by depressing the accelerator pedal beyond wide open throttle position switch 145 is closed to thereby energize the solenoid 142 and thus move valve 118 to shut off the fluid system to clutch B and brake C, as shown in Figs. 10 and 14. This allows the overrunning brake to move to wedging position holding the sun gear sleeve from rotation so that the drive will be reduced through the planetary gearing. It will be understood of course that if the driven shaft overruns the tail shaft free wheeling will result. By releasing the accelerator pedal to a position where the throttle valve will be partly open, the fluid control valve will return to open position and the drive will immediately return to high speed. Thus by depressing and releasing the accelerator pedal the drive speed can be shifted between high and third. The fluid pump is such that a constant fluid pressure is maintained during all engine operating conditions and thus operation delay and high pressures are avoided.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a power transmitting mechanism, a change speed gearing tail shaft operable at a plurality of driving speeds, a driven shaft, planetary gearing drivingly connecting said shafts, a clutch operable to lock or release said planetary gearing, an overrunning brake operable to lock or release a portion of said planetary gearing and movable into and out of effective position, and a fluid pressure system operable to control the positions of said clutch and brake.

2. In a power transmitting mechanism, a change speed gearing tail shaft operable at a plurality of driving speeds, a driven shaft, planetary gearing drivingly connecting said shafts, a self-releasing clutch operable to lock said planetary gearing to transmit direct drive, a self-engaging overrunning brake connected with a portion of said planetary gearing to transmit a reduced drive, said brake having a portion shiftable into and out of effective position, and a control system for simultaneously engaging said planetary locking clutch and shifting said overrunning brake portion to ineffective position.

3. In a power transmitting mechanism, a change speed gearing tail shaft operable at a plurality of driving speeds, a driven shaft, planetary gearing drivingly connecting said shafts, a clutch operable to lock or release said planetary gearing, an overrunning brake operable to lock or release a portion of said planetary gearing having a portion movable into and out of effective position, a fluid pressure system operable to control said clutch and brake, and means under manual control for controlling said fluid system.

4. In a power transmitting mechanism, a change speed gearing tail shaft operable at a plurality of driving speeds, a driven shaft, planetary gearing drivingly connecting said shafts, a clutch operable to lock or release said planetary gearing, an overrunning brake operable to lock or release a portion of said planetary gearing and movable into and out of effective position, a fluid pressure system operable to control said clutch and brake, and a valve in said system for controlling the application of fluid pressure to said clutch and brake.

5. In a power transmitting mechanism, a change speed gearing tail shaft operable at a plurality of driving speeds, a driven shaft, planetary gearing drivingly connecting said shafts, a clutch operable to lock or release said planetary gearing, an overrunning brake operable to lock or release a portion of said planetary gearing, a fluid pressure system operable to control said clutch and brake, a control valve in the fluid pressure system and a manually controlled solenoid operatively associated with said valve.

6. In a power transmitting mechanism, a change speed gearing tail shaft operable at a plurality of driving speeds, a driven shaft, planetary gearing drivingly connecting said shafts, a clutch operable to lock or release said planetary gearing, an overrunning brake operable to release a portion of said planetary gearing, a fluid pressure system operable to control said clutch and brake, a valve in said fluid pressure system for controlling the application of fluid to said clutch and brake, an electric system including a solenoid for opening said valve, and throttle valve mechanism operable to open or close the electric system.

7. In a power transmitting mechanism, a change speed gearing tail shaft operable at a plurality of driving speeds, a driven shaft, planetary gearing drivingly connecting said shafts, a self-releasing clutch operable to lock said planetary gearing to transmit drive therethrough, a self-engaging overrunning brake connected with a portion of said planetary gearing to transmit reduced drive therethrough, a pressure system associated to engage said clutch and to release said overrunning brake, a valve in said pressure system for controlling the application of pressure to said clutch and brake, throttle valve mechanism, and means under the control of said throttle valve mechanism for controlling said pressure control valve.

8. In a power transmitting mechanism, change speed gearing having a tail shaft operable at a plurality of driving speeds, a driven shaft, planetary gearing drivingly connecting said shafts, a clutch operable to lock or release said planetary gearing, an overrunning brake operable to lock or release a portion of said planetary gearing, shift means for the change speed gearing including a rail, pressure means for controlling said clutch and brake, a bell crank engageable with a portion of said clutch and under the control of said rail to hold a portion of said planetary gearing stationary when said change speed gearing is in reverse drive and said overrunning brake is free.

9. In a power transmitting mechanism, a change speed gearing tail shaft operable at a plurality of driving speeds, a driven shaft, planetary gearing drivingly connecting said shafts, said planetary gearing including a sun gear sleeve telescoping said driven shaft, a casing containing said mechanism, a clutch operable to lock or release said planetary gearing, an overrunning brake associated with said casing and said sun gear sleeve, bearings in said casing for said driven shaft and said planetary gearing, a fluid system leading from the bottom of said casing to said clutch and brake, a pump in said system driven by said change speed gearing for forcing oil from the bottom of said casing to said clutch and brake, a valve under manual control in said fluid system between said pump and said clutch and brake, and passage means in said driven shaft leading from said fluid system to said bearings.

10. In a power transmitting mechanism, a change speed gearing tail shaft operable at a plurality of driving speeds, a driven shaft, planetary gearing drivingly connecting said shafts, a casing structure for the shafts and gearing, said planetary gearing including a sun gear shaft rotatably mounted on said driven shaft, a clutch operable to engage or disengage said planetary gearing, an overrunning brake operable to engage or disengage said sun gear shaft and said casing, a fluid pressure system leading from the bottom portion of said casing to said clutch and brake, a portion of said system including a space between said sun gear shaft and said driven shaft, the pump driven by said change speed gearing for moving oil from the casing through said pressure system, valve means controlling the flow of oil through said system located intermediate the clutch and brake and the pump, means under manual control for controlling said valve, a bearing in said casing for said sun gear shaft, a bearing in said driven shaft for said tail shaft and oil passages in said sun gear shaft and said driven shaft leading from said fluid system to said bearings.

11. In a power transmitting mechanism, a change speed gearing tail shaft operable at a plurality of driving speeds, a driven shaft, planetary gearing drivingly connecting said shafts and including a sun gear sleeve rotatably mounted on said driven shaft, a casing for said gearing, a clutch operable to lock or release said planetary gearing, an overrunning brake between said sleeve and said casing, means urging said overrunning brake to hold said sleeve with said casing, and fluid pressure means under manual control operable to disengage said overrunning brake from said sun gear sleeve.

12. In a power transmitting mechanism, a change speed gearing tail shaft operable at a plurality of driving speeds, a driven shaft, planetary gearing drivingly connecting said shafts, a casing carrying the foregoing structure, a normally released clutch operable to lock said planetary gearing, said planetary gearing including a sun gear sleeve rotatably mounted on said driven shaft, an overrunning brake between said casing and said sleeve, means normally operative to engage said brake to hold said sleeve with said casing, and a fluid pressure system under manual control connected to simultaneously release said locking clutch and to disengage said overrunning brake.

13. In a power transmitting mechanism, change speed gearing shift rails, a change speed gearing tail shaft operable at a plurality of driving speeds, a driven shaft, planetary gearing drivingly connecting said shafts, a clutch operable to lock or release said planetary gearing, an overrunning brake operable to lock or release a portion of said planetary gearing, a fluid pressure system leading to said clutch and brake and traversed by said rails, said rails being provided with passage means to allow fluid flow to the clutch and brake only when the rails are in position for the change speed gearing to drive the tail shaft at high speed, and means between said rails and said clutch and brake operable to control the flow of fluid.

14. In a power transmitting mechanism for motor vehicles, change speed gearing shift rails, a change speed gearing tail shaft operable at a plurality of speed ratios, a driven shaft, planetary gearing drivingly connecting said shafts, a casing for the foregoing structure, a self-releasing clutch operable to lock said planetary gearing to provide a direct drive from the tail shaft to the driven shaft, a self-releasing overrunning brake between a portion of the planetary gearing and the casing, a power system leading to said clutch and brake for engaging the planetary locking clutch and disengaging the overrunning brake, a pressure system in the casing leading to said clutch and brake and traversing said rails, said rails having passages therein registering when the change speed tail shaft is in high speed ratio to open the pressure system, and a valve in said pressure system between said rails and said clutch and brake, and means under manual control for regulating the position of said valve to open or close the system to said clutch and brake when the rail passages register.

15. In a power transmitting mechanism for motor vehicles, change speed gearing shift rails, a change speed gearing tail shaft operable at a plurality of speed ratios, a driven shaft, planetary gearing drivingly connecting said shafts, a casing for the foregoing structure, a self-releasing clutch operable to lock said planetary to provide a direct drive from the tail shaft to the driven shaft, a self-releasing overrunning brake between a portion of the planetary gearing and the casing, a power system leading to said clutch and brake for engaging the planetary locking clutch and disengaging the overrunning brake, a pressure system in the casing leading to said clutch and brake and traversing said rails, said rails having passages therein registering when the change speed tail shaft is in high speed ratio to open the pressure system, and a valve in said pressure system between said rails and said clutch and brake, means normally opening said valve, an electric system operable to open said valve, throttle operating mechanism, and a switch in said electric system under the control of said throttle operating mechanism.

16. In a power transmitting mechanism for motor vehicles, change speed gearing shift rails, a change speed gearing tail shaft operable at a plurality of speed ratios, a driven shaft, planetary gearing drivingly connecting said shafts, a casing for the foregoing structure, a self-releasing clutch operable to lock said planetary to provide a direct drive from the tail shaft to the driven shaft, a self-releasing overrunning brake between a portion of the planetary gearing and the casing, a power system leading to said clutch and brake for engaging the planetary locking clutch and disengaging the overrunning brake, a pressure system in the casing leading to said clutch and brake and traversing said rails, said rails having passages therein registering when the change speed mechanism is in high speed ratio to open the pressure system, and a valve in said pressure system between said rails and said clutch and brake, and vent means in the shift rail nearest the source of pressure operable in an intermediate speed to release the system therebeyond but closed to the system feeding thereto.

17. In a power transmitting mechanism, a change speed gearing tail shaft, a driven shaft, planetary gearing drivingly connecting said shafts, said planetary gearing including a sun gear fixed on a sleeve rotatably mounted on said driven shaft, a casing for the foregoing structure, a normally engaged one-way brake between said sleeve and said casing, a normally released clutch operable to lock the planetary gearing, fluid pressure means having a main feed line terminating in two feed lines leading one to the clutch and the other to the brake, a valve in the main feed line operable to stop or allow passage of fluid thereby, said fluid acting to simultaneously reverse the normal relation of said clutch and brake when effective, and a relief for said feed lines when the single line is closed under control of said valve.

18. In a power transmitting mechanism, a change speed gearing tail shaft, a driven shaft, planetary gearing drivingly connecting said shafts, said planetary gearing including a sun gear sleeve rotatably mounted on said driven shaft, a casing for the foregoing structure, a one-way brake between said sleeve and said casing, a spring-pressed plunger bearing against said brake to normally engage the same and lock said sleeve, another plunger bearing against said one-way brake and operable to disengage the same, a spring-released disk clutch operable to lock the planetary gearing, plungers for engaging said disk clutch, fluid pressure means leading to the plungers of said clutch and brake, a valve for controlling the flow of fluid to said clutch and brake and means under manual control for controlling said valve.

19. In a power transmitting mechanism for motor vehicles, a change speed gearing tail shaft, a driven shaft, planetary gearing drivingly connecting said shafts, said planetary gearing including a sun gear sleeve rotatably mounted on said driven shaft, a spring-released disk clutch for locking said planetary gearing, a casing enclosing the foregoing structure, a one-way brake adjacent a portion of said casing and said sun gear sleeve, means normally engaging said one-way brake to fix said sleeve when the driven shaft is not overrunning the tail shaft, pressure operable means for overcoming the spring pressed plunger and releasing the one-way brake, a substantially constant fluid pressure system connected to actuate the pressure plunger of said one-way brake to release the same and to engage the disk clutch simultaneously, valve means in said fluid pressure system for opening or closing the same to the clutch and brake, an electric system including a solenoid associated with said valve for opening the same, a throttle valve control mechanism, and self-opening switch means in said electric system arranged to be closed by operation of said throttle control mechanism beyond a position in which the throttle valve is fully opened.

20. In a power transmitting mechanism for motor vehicles, a casing, a change speed gearing tail shaft, a driven shaft in the casing, planetary gearing drivingly connecting said shafts, said planetary gearing including a sun gear fixed on a sleeve rotatably mounted on said driven shaft, a normally engaged one-way brake between said sleeve and said casing, a normally released disk clutch operable to lock the planetary gearing, fluid pressure passage means in the casing wall, a pump in the lower portion of the casing driven by the change speed gearing for moving lubricating oil through said passage means, change speed gearing shift rails traversing said passage means and having ports therethrough controlling the flow of oil thereby to open the passage means only when the change speed gearing tail shaft is in high speed driving relation, a normally closed valve in said passage means between said rails and said clutch and brake, an electric system including a solenoid for moving said valve to open position, a self-opening switch for controlling said electric system, and throttle valve operating mechanism positioned to close said switch when moved beyond position fully opening the throttle valve.

JESSE G. VINCENT.